Patented Aug. 10, 1948

2,446,984

UNITED STATES PATENT OFFICE 2,446,984

THERMOSETTING VINYL CHLORIDE-CONTAINING PLASTICS

Thomas H. Rogers, Jr., and Robert D. Vickers, Akron, Ohio, assignors to Wingfoot Corporation, Akron, Ohio, a corporation of Delaware No Drawing. Application April 21, 1944, Serial No. 532,216

11 Claims. (Cl. 260—86)

This invention relates to improved plastic compositions having desirable thermosetting characteristics and to a method of making the same. More particularly, it relates to the effect of amines in the curing of polymerized masses.

A thermoplastic resin which can be made thermosetting is obviously desirable in the manufacture of molded parts where the resin must be easily manipulatable before setting and comparatively immobile after it has been given its final shape. This is also true in the manufacture of extruded articles where the resin must be soft enough in the uncured state to be extruded and then, when subject to pressure and heat, to become set. Also, a resin having these characterisitcs would find use in the building of structures from fabric coated with the resin, such as pontoons, inflatable boats, and gas containers. In the manufacture of such fabric articles, a seam which is sealed with the resin must be capable of withstanding a test load at an elevated temperature without flow. A method of treating resins which would effect the desired thermosetting would, therefore, be of great value. The present invention has as an object the provision of plastic compositions affording the above-indicated advantages. Another object is the provision of a method of treating resins to secure this result.

According to the terms of this invention, certain polymerized compositions, which have desirable properties as plastics for the production of molded parts such as heels and soles, and for other purposes, are so treated as to increase their strength and resistance to flow and also to reduce their solubility in solvents, by curing the compositions in a prescribed manner. The compositions which have been found to be amenable to the treatment are copolymers made by polymerizing monomeric compounds, including vinylidene chloride and vinyl chloride. The treatment comprises curing or vulcanizing the copolymer by heating the same in the presence of a heterocyclic amine, which results in a composition of improved modulus as compared with the uncured stock and also of greatly lessened or wholly eliminated solubility in various solvents, such as methyl ethyl ketone.

The plastics which are thus improved in physical characteristics by treatment according to the hereindescribed method are those containing from 10% to approximately 25% of vinylidene chloride, the balance of the monomeric mixture, 90% to 75%, from which the polymer is made being vinyl chloride. Particularly good results are obtained by the treatment of copolymers ranging from about 10% to 20% of vinylidene chloride, and, correspondingly, from about 90% to 80% of vinyl chloride. Among others, many commercial resins may be treated with advantage, including copolymers of vinyl chloride-vinylidene chloride 85:15, and vinyl chloride-vinylidene chloride 90:10.

The method is accomplished by heating the resin to a curing temperature, such as a temperature between about 240 to 360° F., although the temperature may be higher or lower than this, in the presence of a heterocyclic amine until the tensile strength and elongation of the material have attained the desired values. The amines which may be used include, among others, hexamethylene tetramine, piperidine, piperazine, morpholine, pyridine, quinoline, quinaldine, thiazine, pyrrolidine, and pyrimidine.

The amine is used in the proportion of about 1% to 10% on the weight of the plastic or polymer, but best results are usually obtained when 4% to 6% is used.

In addition to the heterocyclic amine, there may be present in the stock to be cured, an acid inhibitor or acceptor, such as magnesium oxide, sodium carbonate or carcium oxide, which while not essential for cure, aids in preventing the deterioration of the composition at the elevated temperatures of cure and thus gives optimum physical properties. There will also be present, in most instances, a plasticizer such as dibutyl sebacate, methoxy ethyl oleate, dioctyl phthalate, tributyl phosphate, and the like, although it will be understood that the plasticizer is not strictly necessary in carrying out the method of the invention. However, the plasticizer may affect the rate of cure and, to this extent, must be considered in connection with the performance of the process. Also, the plasticizer is required in varying amounts to give a stock of selected characteristics, the desired result being obtained as a result of the influence of the cure in the presence of the plasticizer. Carbon black and other pigments may also be present if desired.

Stearic acid or zinc oxide may also be present with the heterocyclic amine in the copolymer to be cured. However, good results are obtained without the use of these adjuvants.

To illustrate the invention, the following examples are given, the same being purely illustrative and not intended in a limiting sense.

EXAMPLE 1

A suitable stock was prepared by mixing granular or powdered vinyl chloride-vinylidene chloride copolymer (85:15) with about 25% of the total dibutyl sebacate to be added as a plasticizer. The mix was then placed on a hot mill. After ten minutes mixing, the remainder of the dibutyl sebacate was added, followed by magnesium oxide and carbon black in the proportions indicated below. Before hexamethylene tetramine is added to the mass, the mill is cooled by running cold water through it. The hexamethylene tetramine is thoroughly mixed in, and the stock is then sheeted out and cut for cure. The stock was cured by placing between aluminum foil, to prevent sticking, and cured in a press at a temperature of 320° F. under a pressure of 1,500 pounds (p. s. i.). Such a basic stock may even be additionally compounded so as to be readily removed directly from a hot mold, using no aluminum.

The following results were obtained upon test, the tensile strength and elongation being determined on an autographic Scott machine, and solubility in methyl ethyl ketone being determined by rubbing the cured stock with a cloth saturated with the solvent:

vinyl chloride and 15% of vinylidene chloride. This was compounded with 35 parts of dibutyl sebacate as a plasticizer, 5 parts of MgO and one part of carbon black. Two samples of the stock were tested, one being a control and the other containing two parts of hexamethylene tetramine, and each sample was then cured at a temperature of 320° F.

*Vinyl chloride-vinylidene chloride 85:15*

| Cure in min. | No curing agent | | | Curing agent | | |
|---|---|---|---|---|---|---|
| | Tens. | Elong. | Sol. in MEK | Tens. | Elong. | Sol. in MEK |
| 10 | 42 | 250 | S | 88 | 250 | SS |
| 20 | 52 | 250 | S | 138 | 275 | NS |
| 40 | 58 | 250 | S | 130 | 210 | NS |
| 60 | 56 | 250 | S | 118 | 150 | NS |

This comparison shows, as between samples cured with a curing agent and without a curing agent, that the presence of the curing agent re-

| | (1) | (2) | (3) | (4) | (5) | (6) |
|---|---|---|---|---|---|---|
| *Formulae* | | | | | | |
| Vinyl-vinylidene chloride polymer | 100.00 | 100.00 | 100.00 | 100.00 | 100.00 | 100.00 |
| Dibutyl sebacate | 35.00 | 35.00 | 35.00 | 35.00 | 35.00 | 35.00 |
| MgO | | 2.00 | 5.00 | | 2.00 | 5.00 |
| Carbon Black | 1.00 | 1.00 | 1.00 | 1.00 | 1.00 | 1.00 |
| Hexamethylene tetramine | | | | 2.00 | 2.00 | 2.00 |
| *Results* | | | | | | |
| Cure 320° F. for Tensile in kg/cm.² at room temp.: | | | | | | |
| 10 min | 47 | 44 | 46 | 75 | 78 | 88 |
| 20 min | 50 | 52 | 56 | 100 | 125 | 138 |
| 40 min | 51 | 58 | 56 | 75 | 122 | 130 |
| 60 min | 50 | 56 | 55 | 78 | 104 | 118 |
| Elong. at room temp. in percent: | | | | | | |
| 10 min | 225 | 200 | 200 | 250 | 250 | 250 |
| 20 min | 225 | 250 | 225 | 300 | 315 | 275 |
| 40 min | 250 | 250 | 235 | 200 | 225 | 210 |
| 60 min | 225 | 250 | 235 | 200 | 175 | 150 |
| Solubility in Methyl ethyl ketone:¹ | | | | | | |
| 10 min | S | S | S | S | SS | SS |
| 20 min | S | S | S | SS | NS | NS |
| 40 min | S | S | S | NS | NS | NS |
| 60 min | S | S | S | NS | NS | NS |
| Hardness at room temp. Type A Durometer: | | | | | | |
| 10 min | 71 | 70 | 71 | 72 | 75 | 75 |
| 20 min | 71 | 72 | 72 | 72 | 76 | 74 |
| 40 min | 73 | 72 | 73 | 73 | 77 | 78 |
| 60 min | 72 | 74 | 73 | 74 | 77 | 77 |

¹ S—Soluble; SS—slightly soluble; NS—not soluble.

It will be noted that the tensile strength was doubled by the use of hexamethylene tetramine over that obtained when no amine was present. The cooperating effect of magnesium oxide as an acid inhibitor is also revealed, but the specific effect of the hexamethylene tetramine is clearly apparent, more especially in the drawing, which displays several curves based on the data of the foregoing example. The remarkable influence of the hexamethylene tetramine on solubility is also clearly shown, the samples containing the amine, but not those without it, becoming insoluble when the cure is sufficiently advanced. It will be obvious that a composition of increased tensile strength and resistance to flow and of comparative insolubility with respect to solvents, of which methyl ethyl ketone (MEK) is merely exemplary, is of importance in structures and articles which are subject to stresses and exposed to solvents in use.

EXAMPLE 2

To show the utility of the invention with respect to improvement of physical characteristics and solubility, a composition was made up of 100 parts of a commercial resin containing 85% of sults in a product having greater tensile strength after the initial stage of the cure, and which, when heated for a sufficient time, loses its solubility in methyl ethyl ketone (MEK), a standard solvent for testing this type of resin. Heating in the absence of the curing agent does not lessen solubility in the solvent.

The products treated by the herein described method have their properties improved in a number of respects, all tending toward materials of more useful characteristics. As mentioned, the tensile strength is increased, this being true both at room temperature and at higher temperatures, such as 135° F., a temperature often used as a standard in testing the strength of adhesive materials. At the same time, the tendency of the resin to cold flow is sharply reduced, while no appreciable increase in hardness is apparent. The shear strength is also greatly improved.

The products may be described as resins comprising a copolymer of vinylidene chloride and vinyl chloride, plus the residue of an amine. Upon heating such a mixture, either with or without a plasticizer, a profound change in physical properties takes place, and the resin becomes thermosetting. Accompanying this is a change in the chemical structure of the resin, as evidenced by nitrogen extraction, and, more particularly, chlorine extraction. Thus, a sample of uncured resin prepared from vinyl chloride and vinylidene chloride 85:15 was extracted with acetone, and it was found that more nitrogen could be extracted from the uncured sample than could be extracted from the cured sample. For example, the nitrogen remaining in an extracted uncured sample varied from 0.11% to 0.05%, whereas the nitrogen remaining in an extracted cured sample varied from 0.11% to 0.23%.

Even more significant, perhaps, is the result of chlorine extraction: Appropriate acetone extraction of an uncured sample of a vinyl chloride-vinylidene chloride 85:15 resin yielded 0.33% to 0.34% of chlorine in the extraction based on the weight of the resin sample, whereas similar extraction of a cured sample of the same original composition yielded from 0.66% to 0.75% of chlorine on the weight of the sample. This indicates a labilization or loss of chlorine from the copolymer. That is to say, the chlorine is disengaged and is presumably taken up by the magnesium oxide, or other inorganic substance which may be present, to form magnesium chloride or other easily extractable material. As a consequence of the removal or transference of some of the chlorine atoms in the vinyl chloride or vinylidene chloride, bonds are made available for further polymerization of the organic constituents of the resin. Hence, the resin sets under the influence of heat and becomes hard and strong.

Therefore, while the chemical mechanism of the curing operation is not definitely established, it has been observed that vulcanizates obtained by the use of hexamethylene tetramine as curing agent, a substance quite readily extractable from the uncured compositions, generally contain nitrogen in a form which is much less readily extractable than is the nitrogen present in the uncured composition. Furthermore, since the extractions of the cured samples contain ionizable chlorine, removal of chlorine from the polymer chain is indicated.

As set forth above, various heterocyclic amines may be used and will give improved results, excellent results having been obtained by the use of hexamethylene tetramine, either alone, or with zinc oxide or with stearic acid. The heterocyclic amines may be those having a single ring, such as piperidine, or like hexamethylene tetramine having two or more rings. Also, the heterocyclic ring may carry other substituents, as in the case of 1 methyl piperidine, etc.

This application is a continuation in part of application Serial No. 481,076 filed March 30, 1943, in the names of Thomas H. Rogers. Jr., and Robert D. Vickers, for Thermosetting plastics.

While there have been described above the preferred embodiments of the invention, it will be apparent to those skilled in the art that various modifications and changes may be made therein without departing from the spirit of the invention or from the scope of the appended claims.

We claim:

1. The method of preparing a thermoset copolymer which comprises mixing a copolymer of 10 to 25 percent of vinylidene chloride and 75 to 90 percent of vinyl chloride with from 1 to 10 percent by weight of the copolymer of a heterocyclic amine containing only carbon, hydrogen and amino nitrogen atoms and heating said mixture at a temperature between 240° F. and 360° F. for a period of between 10 and 60 minutes.

2. A thermoset copolymer prepared by mixing a copolymer of 10 to 25% of vinylidene chloride and 75 to 90% of vinyl chloride with from 1 to 10% by weight of the copolymer of a heterocyclic amine containing only carbon, hydrogen, and amino nitrogen atoms, and heating said mixture at a temperature between 240° F. and 360° F. for a period of between 10 and 60 minutes.

3. The method of preparing a thermoset copolymer which comprises mixing a copolymer of 85 percent of vinyl chloride and 15 percent of vinylidene chloride with from 1 to 10 percent by weight of the copolymer of a heterocyclic amine containing only carbon, nitrogen and amino nitrogen atoms, and heating said mixture at a temperature of between 240° F. and 360° F. for a period of between 10 and 60 minutes.

4. A thermoset copolymer prepared by mixing a copolymer of 85% of vinyl chloride and 15% of vinylidene chloride with from 1 to 10% by weight of the copolymer of a heterocyclic amine containing only carbon, hydrogen and amino nitrogen atoms and heating said mixture at a temperature of between 240° F. and 360° F. for a period between 10 and 60 minutes.

5. The method of preparing a thermoset copolymer which comprises mixing a copolymer of 10 to 25 percent of vinylidene chloride and 75 to 90 percent of vinyl chloride with from 4 to 6 percent by weight of the copolymer of a heterocyclic amine containing only carbon, hydrogen and amino nitrogen atoms and heating said mixture at a temperature between 240° F. and 360° F. for a period of between 10 and 60 minutes.

6. The method of preparing a thermostat copolymer which comprises mixing a copolymer of 10 to 25 percent of vinylidene chloride and 75 to 90 percent of vinyl chloride with from 1 to 10 percent by weight of the copolymer of hexamethylene tetramine and heating said mixture at a temperature between 240° F. and 360° F. for a period of between 20 and 60 minutes.

7. The method of preparing a thermoset copolymer which comprises mixing a copolymer of 85 percent of vinyl chloride and 15 percent of vinylidene chloride with from 1 to 10 percent by weight of the copolymer of hexamethylene tetramine, and heating said mixture at a temperature of between 240° F. and 360° F. for a period of between 10 and 60 minutes.

8. The method of preparing a thermoset copolymer which comprises mixing a copolymer of 10 to 25 percent of vinylidene chloride and 75 to 90 percent of vinyl chloride with from 1 to 10 percent by weight of the copolymer of hexamethylene tetramine and heating said mixture at a temperature between 240° F. and 360° F. for a period of between 15 and 30 minutes.

9. The method of preparing a thermoset copolymer which comprises mixing a copolymer of 85 percent of vinyl chloride and 15 percent of vinylidene chloride with from 1 to 10 percent by weight of the copolymer of hexamethylene tetramine, and heating said mixture at a temperature between 240° F. and 360° F. for a period of between 15 and 30 minutes.

10. The method of preparing a thermoset copolymer which comprises mixing a copolymer of 10 to 25 percent of vinylidene chloride and 75 to 90 percent of vinyl chloride with from 1 to 10 percent by weight of the copolymer of hexamethylene tetramine and heating said mixture at a temperature between 240° F. and 360° F. until the copolymer is cured.

11. The method of preparing a thermoset copolymer which comprises mixing a copolymer of 85 percent of vinyl chloride and 15 percent of vinylidene chloride with from 1 to 10 percent by weight of the copolymer of hexamethylene tetraamine, and heating said mixture at a temperature between 240° F. and 360° F. until the copolymer is cured.

THOMAS H. ROGERS, Jr.
ROBERT D. VICKERS.

REFERENCES CITED

The following references are of record in the file of this patent:

UNITED STATES PATENTS

| Number | Name | Date |
|---|---|---|
| 2,013,941 | Young | Sept. 10, 1935 |
| 2,148,831 | Raynolds | Feb. 28, 1939 |
| 2,190,776 | Ellingboe et al. | Feb. 20, 1940 |
| 2,205,654 | Ide et al. | June 25, 1940 |
| 2,245,742 | Alexander | July 17, 1941 |
| 2,304,637 | Hardy | Dec. 8, 1942 |